(12) United States Patent
Bielenberg et al.

(10) Patent No.: US 12,540,281 B2
(45) Date of Patent: Feb. 3, 2026

(54) INTEGRATED PYROLYSIS AND GASIFICATION OF BIOMASS

(71) Applicant: ExxonMobil Technology and Engineering Company, Annandale, NJ (US)

(72) Inventors: James R. Bielenberg, Lebanon, NJ (US); Rustom M. Billimoria, Hellertown, PA (US); Xiaochun Xu, Basking Ridge, NJ (US); Arun K. Sharma, Hellertown, PA (US)

(73) Assignee: EXXONMOBILE TECHNOLOGY AND ENGINEERING COMPANY, Spring, TX (US)

( * ) Notice: Subject to any disclaimer, the term of this patent is extended or adjusted under 35 U.S.C. 154(b) by 773 days.

(21) Appl. No.: 17/931,577

(22) Filed: Sep. 13, 2022

(65) Prior Publication Data

US 2023/0109160 A1 Apr. 6, 2023

Related U.S. Application Data

(60) Provisional application No. 63/262,157, filed on Oct. 6, 2021.

(51) Int. Cl.
*C10G 9/00* (2006.01)
*C01B 3/50* (2006.01)
*C10J 3/54* (2006.01)
*C10J 3/84* (2006.01)

(52) U.S. Cl.
CPC .............. *C10G 9/005* (2013.01); *C01B 3/50* (2013.01); *C10J 3/54* (2013.01); *C10J 3/84* (2013.01); *C01B 2203/062* (2013.01); *C10G 2300/1011* (2013.01); *C10G 2300/4081* (2013.01); *C10J 2300/0916* (2013.01); *C10J 2300/1612* (2013.01); *C10J 2300/1815* (2013.01)

(58) Field of Classification Search
None
See application file for complete search history.

(56) References Cited

U.S. PATENT DOCUMENTS

| 6,121,504 A * | 9/2000 | Kuechler ............... C07C 1/20 585/910 |
| 10,435,637 B1 * | 10/2019 | Sirdeshpande ....... C07C 1/0485 |
| 2005/0095183 A1 | 5/2005 | Rehmat et al. |

(Continued)

FOREIGN PATENT DOCUMENTS

WO WO-2021163110 A1 * 8/2021 ............. C10K 3/008

*Primary Examiner* — Stefanie J Cohen
(74) *Attorney, Agent, or Firm* — Shook Hardy & Bacon L.L.P.

(57) ABSTRACT

Systems and methods are provided for integrated pyrolysis and gasification of a biomass feed, either as a separate feed or under co-processing conditions. The integrated pyrolysis and gasification can be performed using any convenient reactor configuration, such as fluidized coking reactor configuration or a fluid catalytic cracking reactor configuration. The biomass feed can initially by pyrolyzed to form liquid products, gas phase products, and char. The char can then be used as the input feed to gasification. In aspects where the biomass feed is co-processed, the biomass can be co-processed with a co-feed that is suitable for processing under fluidized coking conditions or other pyrolysis conditions, such as a conventional fluidized coking feedstock.

20 Claims, 1 Drawing Sheet

(56) References Cited

U.S. PATENT DOCUMENTS

| | | | |
|---|---|---|---|
| 2009/0048470 A1* | 2/2009 | Ui | C07C 17/389 568/700 |
| 2010/0083575 A1* | 4/2010 | Varadaraj | C10J 3/72 48/209 |
| 2015/0104862 A1* | 4/2015 | Sutradhar | C10J 3/002 422/198 |
| 2018/0118644 A1 | 5/2018 | Brown et al. | |
| 2019/0144756 A1 | 5/2019 | Le et al. | |
| 2023/0070315 A1* | 3/2023 | Trapp | C10J 3/62 |

* cited by examiner

INTEGRATED PYROLYSIS AND GASIFICATION OF BIOMASS

CROSS-REFERENCE TO RELATED APPLICATIONS

This application claims the benefit of U.S. Provisional Application No. 63/262,157, filed on Oct. 6, 2021, the entire contents of which are incorporated herein by reference

FIELD

Systems and methods are provided for using fluidized coking-type reactor configurations and/or reaction conditions to perform integrated pyrolysis and gasification of biomass and/or associated products derived from biomass.

BACKGROUND

One area of focus for reducing net greenhouse gas emissions from energy production, or more generally for production of carbon-based products, is to use biomass as the source for at least part of the carbon in a fuel or other carbon-based product. Because biomass removes $CO_2$ from the environment as it grows, the net $CO_2$ generated by combustion of a fuel derived from biomass is offset by the $CO_2$ consumed during the growth of the biomass.

Some current strategies for conversion of biomass to fuels involve performing pyrolysis on biomass to form biomass oil. Other strategies can involve gasification of biomass to form synthesis gas. The synthesis gas can then be converted in one or more additional conversion processes into hydrocarbon-like compounds (such as alkanes or alcohols) for storage and/or transport. However, integrating these strategies with existing refinery equipment and processing schemes remains a challenge.

It would be desirable to have systems and methods for production of fuels from biomass that could reduce or minimize generation of excess $CO_2$ while forming hydrocarbon-like products that retain a substantial amount of renewable character. Preferably, the systems and methods can also reduce or minimize the modifications of existing refinery process schemes, to allow for ready integration of the biomass processing methods with existing refinery processes.

U.S. Patent Application Publication 2018/0118644 describes performing both partial oxidation and pyrolysis of biomass within the same reactor environment, so that the heat for the pyrolysis reaction can be generated in-situ by the partial oxidation.

U.S. Patent Application Publication 2005/0095183 describes a multi-stage gasification system for conversion of biomass or municipal solid waste into a synthesis gas product while reducing the amount of carbon char and/or tar in the product.

U.S. Patent Application Publication 2019/0144756 describes methods for fluidized coking with increased liquids production.

SUMMARY

In an aspect, a method is provided for converting biomass. The method includes exposing a feed comprising biomass to a fluidized bed containing solid particles in a reactor under pyrolysis conditions to form i) a liquid pyrolysis product including pyrolysis oil, ii) char, coke, or a combination thereof, and iii) a gas phase pyrolysis product, at least a portion of the char, coke, or combination thereof being deposited on the solid particles. The method further includes passing at least a portion of solid particles including deposited char, coke, or a combination thereof from the reactor into a gasifier. The method further includes introducing an oxygen-containing stream and steam into the gasifier. The method further includes exposing the at least a portion of the solid particles including deposited char, coke, or a combination thereof to partial oxidation conditions in the gasifier to form a partially gasified particles and a gas phase gasifier product comprising CO, $CO_2$, and optionally $H_2$. Additionally, the method includes passing at least a portion of the partially gasified particles from the gasifier to the reactor. In some aspects, the reactor and gasifier can correspond to a reactor and gasifier from a fluidized coking system. In some aspects, the reactor and gasifier can correspond to a fluid catalytic cracking reactor and an associated regenerator.

DETAILED DESCRIPTION

Figure 1:
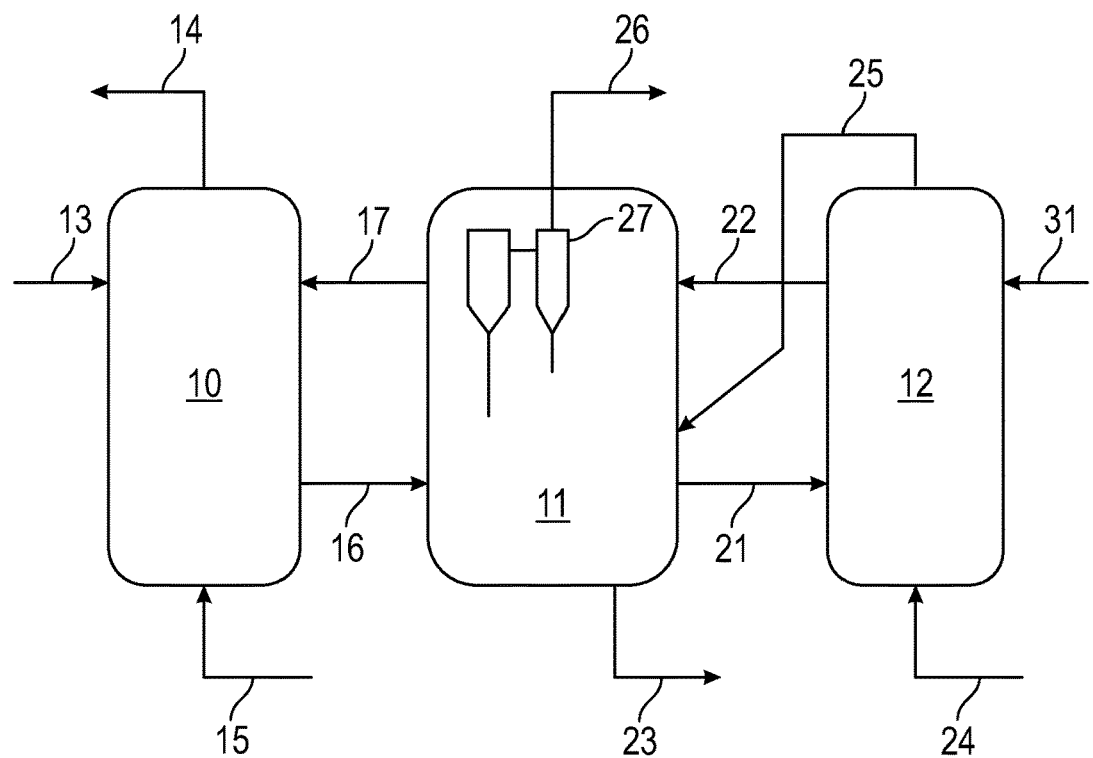
FIG. 1 shows an example of a fluidized bed coking system including a coker, a heater, and a gasifier.

All numerical values within the detailed description and the claims herein are modified by "about" or "approximately" the indicated value, and take into account experimental error and variations that would be expected by a person having ordinary skill in the art.

Overview

In various aspects, systems and methods are provided for integrated pyrolysis and gasification of a biomass feed, either as a separate feed or under co-processing conditions, whereby biomass is co-fed with a (conventional) coker feed such as a feed containing reside or heavy crude oil. It is noted that the term "gasification" is used herein to broadly cover conversion of biomass to CO and/or $H_2$ in varying ratios of CO to $H_2$, including partial burn conditions that result in a reduced or minimized amount of $H_2$ production (such as substantially no $H_2$ production). The integrated pyrolysis and gasification can be performed using a fluidized coking reactor configuration, a fluid catalytic cracking reactor configuration, or another convenient configuration that includes a reactor and an associated gasifier (such as the regenerator of a fluidized catalytic cracking reactor configuration). The biomass feed can initially by pyrolyzed to form liquid products, gas phase products, and char. The char can then be used as the input feed to gasification. In aspects where the biomass feed is co-processed, the biomass can be co-processed with a co-feed that is suitable for processing under fluidized coking conditions or other pyrolysis conditions, such as a conventional fluidized coking feedstock.

A variety of unexpected features and/or benefits can be realized by using integrated pyrolysis and gasification to process biomass and/or to co-process biomass with a conventional feed for fluidized coking. One example of a benefit is a reduction in net greenhouse gas emissions. By integrating pyrolysis and gasification, the heat for pyrolysis can be provided by the heat generated during gasification. Because $CO_2$ was consumed by the biomass during the growth of the biomass, any $CO_2$ generated from gasification of the biomass represents no net addition of $CO_2$ to the environment.

In aspects where co-processing is performed, the reduction in net $CO_2$ production can be proportional to the amount of biomass char that is gasified relative to the amount of conventional feed that is gasified.

As another example, a feature or benefit of performing integrated pyrolysis and gasification for processing of biomass is the ability to form an unexpected product slate from a biomass feed. Conventionally, using pyrolysis to process biomass can allow for production of substantial amounts of a liquid product, but this is accompanied by production of associated gas phase products and char. Conventionally, using gasification to process biomass can reduce or minimize formation of char, but using gasification to convert biomass without char formation also results in little or no production of liquid products. In contrast to conventional processing, by using integrated pyrolysis and gasification, an unexpected product slate can be generated that includes a majority of liquid products while having little or no net char production. By integrating pyrolysis and gasification, the char generated during pyrolysis can be used as an input flow for the integrated gasification process. This can allow substantially all of the char generated during pyrolysis to be converted into carbon oxides by gasification.

Still another unexpected benefit or feature can be related to synergies between the gasification conditions and the pyrolysis processing conditions. In various aspects, the gasification conditions can be selected so that partial oxidation of char is performed in the gasifier. Any coke generated by co-processing of a conventional feed in the reactor can also be exposed to the partial oxidation conditions. Operating the gasifier under partial oxidation conditions can allow a synthesis gas product to be recovered from the gas phase products of the gasifier. The synthesis gas product can be used as a fuel, or the synthesis gas product can be used as an input flow for the production of additional liquid products.

In aspects where the gasifier is operated under partial oxidation conditions, so that an increased amount of CO is produced, the amount of heat generated per carbon atom introduced into the gasifier will be lower than the heat that would be generated by performing full oxidation and converting substantially all carbon into $CO_2$. Due to this reduction in heat generated by the gasifier, there is an increased likelihood that maximizing the production of liquids in the pyrolysis reactor may result in production of insufficient amounts of coke and/or char to maintain heat balance in the integrated system. For a conventional pyrolysis process, the goal is to select process conditions that maximize liquid yield. By contrast, in some aspects, instead of maximizing the ratio of liquid products to char that is generated during pyrolysis, the relative amount of char production can be increased so that additional char is provided to the gasification process. In such aspects, the increased char production can allow sufficient char to be delivered to the gasifier to maintain heat balance and/or can reduce or minimize the amount of additional biomass (or other fuel) that is added as a supplemental fuel to the gasifier.

It is noted that in aspects where the ratio of liquid products to char is reduced in the pyrolysis stage, an additional benefit of the integrated pyrolysis and gasification system is that additional liquid product can be generated from the synthesis gas produced in the gasifier. As a result, in some aspects, reducing the liquid yield in the pyrolysis stage may result in an increase in the overall liquid yield and/or the liquid yield per $CO_2$ generated by the combined process.

In some aspects where integrated pyrolysis and gasification is performed, biomass can correspond to less than 50 wt % of the feed. In such aspects, the heat generated in the gasifier from partial oxidation can be sufficient to maintain heat balance while still operating at maximum liquid yield for the pyrolysis reaction. In other aspects, such as some aspects where biomass corresponds to 50 wt % or more of the feed, the pyrolysis conditions can be selected to provide increased char production. Additionally or alternately, in some aspects where the char and/or coke generated during pyrolysis is not sufficient, additional biomass can be added to the gasifier in order to maintain heat balance.

The integrated pyrolysis and gasification can be performed in a plurality of vessels. A first vessel can correspond to the reactor where pyrolysis of the biomass occurs. This pyrolysis can be performed under conditions similar to fluidized coking conditions. However, the portion of the feed corresponding to biomass can result in production of "char" rather than coke, with char corresponding to a carbonaceous product formed under the pyrolysis conditions. In aspects where co-processing is performed, a mixture of char and coke can be generated in the reactor. The pyrolysis and/or fluidized coking conditions can also result in production of pyrolysis oil. This pyrolysis oil can undergo subsequent processing, such as fluid catalytic cracking or hydrotreatment, to upgrade the pyrolysis oil to a desired product. In aspects where co-processing is performed, the liquid products can correspond to a mixture of pyrolysis oil and conventional fluidized coking products, such as coker naphtha, coker distillate, and/or coker gas oil.

The char (and optionally coke) can then be passed into a separate vessel for gasification under partial oxidation conditions. This can generate heat, which can provide the heat required for maintaining the pyrolysis reaction in the first vessel. However, by performing the partial oxidation in a separate vessel, any combustion of the desired pyrolysis oil product can be reduced or minimized, as oxygen is not separately added to the pyrolysis reaction zone. Instead, the oxygen for gasification is added to the separate vessel. In various aspects, the pyrolysis reactor can be substantially free of added oxygen during the pyrolysis. This can correspond to an added oxygen content of 0.1 vol % or less in the pyrolysis environment. Added oxygen corresponds to oxygen added as a gas phase component into the pyrolysis environment. It is noted that any oxygen included in the biomass feed is excluded from the definition of the added oxygen.

In some aspects where a substantial portion of biomass is present in the feed, additional particles can also be present in the reaction environment and/or can be added to the reaction environment. In a conventional fluidized coking process, coke particles are generated in the fluidized coking environment. The coke particles are partially gasified to provide heat, but the remaining mass of coke (in the form of particles) after the partial gasification can be sufficient to transport heat from the gasifier to the other reaction vessel(s) in the reaction system. However, in aspects where a sufficient amount of biomass is present in the feedstock, the mass of the char and/or coke that enters the gasifier may be relatively close to the amount of char and/or coke that is needed to maintain heat balance within the system. In such aspects, additional particles can be added to the system to act as a heat transfer particles, and to maintain the fluidized bed nature of the reaction environment in the reactor. In some aspects, relatively inert particles can be used, such as sand. In other aspects, at least a portion of the particles can correspond to a catalyst for catalyzing the pyrolysis reaction.

In this discussion, in some aspects the reactor for performing the pyrolysis may be referred to as a "coker", a "fluidized coker", or a "fluidized bed coker". It is understood that describing the reactor as a type of coker is for convenience, and that more generally any convenient type of reactor can be used that is suitable for performing fluidized bed pyrolysis on a biomass-containing feed, optionally in the form of co-processing with a conventional fluidized coking co-feedstock. In other aspects, the reactor for performing pyrolysis may be referred to as a "riser", such as a riser reactor of the type that is sometimes used for fluid catalytic cracking.

In this discussion, some feeds, fractions, or products may be described based on a fraction that boils below or above a specified distillation point. For example, a 343° C.−product corresponds to a product that substantially contains components with a boiling point (at standard temperature and pressure) of 343° C. or less. Similarly, a 343° C.+ product corresponds to a product that substantially contains components with a boiling point of 343° C. or more. Substantially containing components within a boiling range is defined herein as containing 90 vol % or more of components within the boiling range, optionally 95 vol % or more, such as a product where all components are within the specified boiling range.

In this discussion, a liquid product is defined as a product that is substantially in the liquid phase at 20° C. and ~100 kPa-a. Similarly, a gas product is defined as a product that is substantially in the gas phase at 20° C. and ~100 kPa-a.

In this discussion, reference may be made to conversion of a feedstock relative to a conversion temperature. Conversion relative to a temperature can be defined based on the portion of the feedstock that boils at greater than the conversion temperature. The amount of conversion during a process (or optionally across multiple processes) can correspond to the weight percentage of the feedstock converted from boiling above the conversion temperature to boiling below the conversion temperature. As an illustrative hypothetical example, consider a feedstock that includes 40 wt % of components that boil at 650° F. (~343° C.) or greater. By definition, the remaining 60 wt % of the feedstock boils at less than 650° F. (~343° C.). For such a feedstock, the amount of conversion relative to a conversion temperature of ~343° C. would be based only on the 40 wt % that initially boils at ~343° C. or greater. If such a feedstock could be exposed to a process with 30% conversion relative to a ~343° C. conversion temperature, the resulting product would include 72 wt % of ~343° C.− components and 28 wt % of ~343° C.+ components.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, or Fe).

Feedstocks

In various aspects, a feed including a substantial portion of biomass can be converted by pyrolysis in a fluidized bed coking environment. In some aspects, the feed can be substantially composed of biomass, so that 95 wt % or more (such as up to 100 wt %) of the hydrocarbonaceous feed introduced into the fluidized bed coking environment corresponds to biomass and/or compounds derived from biomass. In other aspects, the biomass can be co-processed with a feedstock not derived from biomass, such as a mineral feedstock and/or a feedstock considered to be a conventional fluidized coking feed based on the boiling range of the feedstock. In various aspects, the biomass can correspond to 5.0 wt % to 100 wt % of the hydrocarbonaceous feed, or 10 wt % to 100 wt %, or 20 wt % to 100 wt %, or 40 wt % to 100 wt %, or 50 wt % to 100 wt %, or 5.0 wt % to 95 wt %, or 10 wt % to 95 wt %, or 20 wt % to 95 wt %, or 40 wt % to 95 wt %, or 50 wt % to 95 wt %, or 50 wt % to 75 wt %, or 5.0 wt % to 75 wt %, or 10 wt % to 75 wt %, or 20 wt % to 75 wt %, or 5.0 wt % to 49 wt %, or 10 wt % to 49 wt %, or 20 wt % to 49 wt %.

The biomass used for a feed can be any convenient type of biomass. Some forms of biomass can include direct forms of biomass, such as algae biomass and plant biomass. Examples of suitable biomass sources can include woody biomass and switchgrass. Other forms of biomass may correspond to waste products, such as food waste, animal waste, paper, and/or other waste products originally formed from biomass materials. In this discussion, municipal solid waste is included within the definition of biomass, even though a portion of the solids in municipal solid waste may not strictly correspond to solids derived from biomass.

In aspects where the biomass is introduced into the pyrolysis reactor (i.e., fluidized coking reactor) at least partially as solids, having a small particle size can facilitate transport of the solids into the reactor. Smaller particle size can potentially also contribute to achieving a desired level of conversion of the biomass. Thus, one or more optional physical processing steps can be used to prepare solid forms of biomass for conversion. To prepare solids for gasification, the solids can be crushed, chopped, ground, or otherwise physically processed to reduce the median particle size to 3.0 cm or less, or 2.5 cm or less, or 2.0 cm or less, or 1.0 cm or less, such as down to 0.01 cm or possibly still smaller. For determining a median particle size, the particle size is defined as the diameter of the smallest bounding sphere that contains the particle.

In some aspects, biomass can be co-processed with one or more additional feeds, such as mineral feeds and/or other conventional feeds based on the boiling range of the feed. Conventionally, heavy oil feeds are typically used as feeds for fluidized coking processes. Examples of heavy oil feeds include, but are not limited to. Thus, the heavy oil feed will typically be a heavy (high boiling) reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt. %, generally from 5 to 50 wt. %. Preferably, the feed is a petroleum vacuum residuum.

A typical petroleum chargestock suitable for processing in a fluidized bed coker can have a composition and properties within the ranges set forth below.

TABLE 1

Example of Coker Feedstock

| | | |
|---|---|---|
| Conradson Carbon | 5 to 40 | wt. % |
| API Gravity | −10 to 35° | |
| Boiling Point | 340° C.+ to 650° C.+ | |
| Sulfur | 1.5 to 8 | wt. % |
| Hydrogen | 9 to 11 | wt. % |

TABLE 1-continued

Example of Coker Feedstock

| Nitrogen | 0.2 to 2 | wt. % |
| Carbon | 80 to 86 | wt. % |
| Metals | 1 to 2000 | wppm |

More generally, an additional feedstock for co-processing in the fluidized bed coker can have a T10 distillation point of 343° C. or more, or 371° C. or more, such as up to have a T10 distillation point of 550° C. or possibly still higher.

Pyrolysis and Gasification Conditions

The biomass-containing feed can be introduced into the reactor for pyrolysis by any convenient method. If a co-feed is used, the biomass can be incorporated into the co-feed. This can result in a slurry and/or solution of biomass in a conventional feed. If the feed is substantially biomass, a method for introducing a feed composed primarily of solids can be used instead, such as a screw feeder. The feed can be pre-heated prior to entering the reactor. For example, in aspects where a conventional co-feed is used to form a slurry, pre-heating can increase the temperature of the feed so that it is flowable and pumpable. The slurry can then be passed into the reactor toward the top of the reactor vessel through one or more slurry injection nozzles.

In various aspects, temperatures in the pyrolysis zone of the reactor can be in the range of 400° C. to 850° C., or 400° C. to 750° C., or 450° C. to 750° C. Pressures can be in the range of 120 kPag to 400 kPag (17 psig to 58 psig), and preferably 200 kPag to 350 kPag (29 psig to 51 psig).

The conditions in the pyrolysis zone can be selected so that a desired amount of conversion of the feedstock occurs in the fluidized bed reactor. The coking reaction and the amount of conversion can be selected to be similar to the values used in a conventional fluidized coking reaction. For example, the conditions can be selected to achieve at least 10 wt % conversion relative to 343° C. (or 371° C.), or at least 20 wt % conversion relative to 343° C. (or 371° C.), or at least 40 wt % conversion relative to 343° C. (or 371° C.), such as up to 80 wt % conversion or possibly still higher. In some aspects, the light hydrocarbon products of the coking (thermal cracking) reactions vaporize, mix with the fluidizing steam and pass upwardly through the dense phase of the fluidized bed into a dilute phase zone above the dense fluidized bed of coke particles. In other aspects, sufficient feed and/or other gas can be introduced into a reactor so that the fluidized bed takes the form of a moving bed, where both feed (in the gas phase) and the solid particles move upward in the reactor. It is noted that in some aspects, other sweep gases such as $CH_4$, $H_2$, or other light gases may be used instead of at least a portion of the steam (such as up to in place of substantially all of the steam) to help control the conversion severity. In some configurations, this mixture of vaporized hydrocarbon products formed in the coking reactions flows upwardly through the dilute phase with the steam at superficial velocities of ~1 to 2 meters per second (~3 to 6 feet per second), entraining some fine solid particles of coke which are separated from the cracking vapors in the reactor cyclones as described above. In other configurations, such as configurations where the reactor corresponds to a riser reactor, the superficial velocities within the reactor could be adjusted to 10 to 25 m/s, or 12 to 21 m/s (roughly 40-70 feet per second) to allow short conversion times. For example, in a riser reactor configuration, the residence time for the feed within the reactor can correspond to roughly 2 to 5 seconds. The cracked hydrocarbon vapors pass out of the cyclones into the scrubbing section of the reactor and then to product fractionation and recovery. The cracked hydrocarbon vapors can include one or more liquid products with a boiling range of 343° C. or less. Examples of 343° C.– liquid products include naphtha boiling range products and distillate boiling range products.

Conventionally, processing of biomass to make fuels usually has a goal of making either liquid products or making gas phase products. When gas phase products are desired, high temperatures can be used to perform gasification. This results in only minimal amounts of char, but also substantially no liquid product. When liquid products are desired, "fast pyrolysis" is used, and the conditions are selected in order to maximize the yield of liquid products. This results in production of smaller amounts of both char and gas phase products. In particular, for fast pyrolysis type conditions, increasing the pyrolysis temperature can decrease the amount of char formed during pyrolysis. Increasing the pyrolysis temperature can also increase the amount of gas formed during pyrolysis. Conventionally, the pyrolysis temperature for a given feed is typically set in order to balance the decrease in char and the increase in gas phase products, so that the liquid yield from pyrolysis is maximized. Similar considerations can also be used for selecting a temperature for fluidized coking, where the temperature can be selected to balance the decrease in coke formation and the increase in gas phase products that results from increasing the temperature.

Conventionally, temperatures between 500° C. and 550° C. can often result in increased or maximized yield of liquid products for feeds processed under pyrolysis (such as fluidized coking) conditions. At such temperatures, for fluidized coking of a conventional and/or mineral fluidized coking feedstock, the weight ratio of coke to gas phase products generated during fluidized coking can generally be 2.0 or higher, or 3.0 or higher, such as up to 15 or possibly still higher. By contrast, pyrolysis of biomass at such temperatures generally results in a weight ratio of char to gas phase products (on a dry basis) of 1.9 or less. Based on this, it is understood that as the weight of biomass in a feed for pyrolysis is increased, the weight ratio of coke and/or char to gas phase products will typically become lower. As noted above, liquid products are defined herein as products from pyrolysis that are liquids at 20° C. and 100 kPa-a. Thus, gas phase products from pyrolysis can correspond to $C_{4-}$ products. Since water is a liquid under this condition, a comparison of char/coke weight with the weight of gas phase products is on a dry basis.

In addition to biomass producing less char under pyrolysis conditions than typical coke production from fluidized coking feeds, the potential heating value per weight of the char derived from biomass is also lower than the heating value of a similar weight of coke. This may be due in part to biomass char having a higher oxygen content than coke from a conventional fluidized coking process. Thus, pyrolysis of biomass both produces less char/coke, and the heating value of the resulting char is lower in comparison with fluidized coking.

In various aspects, when processing a feed containing 50 wt % or more of biomass (or 60 wt % or more, or 70 wt % or more, such as up to 100 wt % biomass), instead of maximizing the liquid product yield from pyrolysis, the pyrolysis conditions can be selected to increase the weight of char and/or coke that is produced relative to the amount of gas phase products. In such aspects, the pyrolysis conditions can be selected to produce a weight ratio of combined char and coke to gas phase products of 1.6 or higher, or 1.8 or higher, or 2.0 or higher, or 2.4 or higher, or 2.8 or higher, such as up to 5.0 or possibly still higher. This increased ratio of char and coke versus gas phase products can allow for increased heat generation in the integrated gasification stage. This can allow for the gasification stage to provide sufficient heat for the pyrolysis reaction based on just the char production, or this can reduce or minimize the amount of additional biomass (or other fuel) that is required to provide heat for the pyrolysis reaction.

In some aspects, as the cracking process proceeds in the reactor, the coke, char, and/or other particles (such as optional sand particles) pass downwardly through the pyrolysis zone, through the stripping zone, where occluded hydrocarbons are stripped off by the ascending current of fluidizing gas (steam). They then exit the coking reactor and pass to the gasification reactor (gasifier) which contains a fluidized bed of solid particles and which operates at a temperature higher than that of the reactor coking zone. In the gasifier, the coke particles are converted by reaction at the elevated temperature with steam and an oxygen-containing gas into a fuel gas comprising carbon monoxide and hydrogen.

In other aspects, the pyrolysis can be performed in a reactor such as a riser reactor. In such aspects, additional particles such as sand particles can optionally be added to the reactor to assist with forming a moving bed that travels up the reactor during the reaction. The optional (sand) particles can carry heat for performing the pyrolysis reaction. The optional (sand) particles can also provide separate particle surfaces for accumulation of coke and/or char during pyrolysis. In this type of aspect, the particles can be separated from the pyrolysis effluent at or near the top of the reactor. The separated particles can then be passed into a separate vessel for gasification/partial oxidation.

The gasification zone is typically maintained at a high temperature ranging from 650° C. to 1000° C., such as 850° C. to 1000° C. (1560° F. to 1830° F.) to maximize $H_2/CO$; or 650° C. to 850° C. to maximize CO; or 650° C. to 760° C. The gasification zone can be maintained at a pressure ranging from 0 kPag to 1000 kPag (0 psig to 150 psig), preferably from 200 kPag to 400 kPag (30 psig to 60 psig). Steam and an oxygen-containing gas are passed into the gasifier for reaction with the solid particles comprising coke deposited on them in the coking zone. Preferably, the oxygen-containing gas can have an oxygen content greater than air. Air can be used, but this increases the volume of nitrogen that will subsequently be separated from the gasifier products in order to recover synthesis gas. Alternatively, if the gasifier products are used as a fuel gas, the additional nitrogen from air reduces the concentration of fuel in the fuel gas. In some aspects, the gasification zone can be contained in a gasifier associated with the reactor, such as a gasifier from a fluidized coking system. In some aspects where a system similar to a fluid catalytic cracking system is used, the gasification zone can be contained in a "gasifier" that corresponds to a regenerator associated with a riser reactor.

In some aspects, the oxygen-containing gas can have a low nitrogen content, such as oxygen from an air separation unit or another oxygen stream including 95 vol % or more of oxygen, or 98 vol % or more, such as up to containing substantially only oxygen. In other aspects, the oxygen-containing gas can generally be enriched relative to air, such as having an oxygen content of 21 vol % or more, or 30 vol % or more, or 40 vol % or more, or 50 vol % or more, such as up to containing substantially only oxygen. In some aspects, the oxygen content can be 21 vol % to 50 vol %, or 21 vol % to 40 vol %, or 21 vol % to 30 vol %. Additionally or alternatively, the $N_2$ content of the oxygen-containing gas can be 70 vol % or less, or 50 vol % or less, or 35 vol % or less, or 20 vol % or less, or 10 vol % or less, such as down to having substantially no content of $N_2$. In aspects where the oxygen-containing gas is enriched relative to air, it may be desirable to also introduce a diluent stream, to facilitate additional heat transport out of the gasifier. An example of a separate diluent stream can be recycled $CO_2$ and/or $H_2S$ derived from the overhead gas produced by the gasifier. The amount of diluent can be selected by any convenient method. For example, the amount of diluent can be selected so that the amount of diluent replaces the weight of $N_2$ that would be present in the oxygen-containing stream if air was used as the oxygen-containing stream. As another example, the amount of diluent can be selected to allow for replacement of the same BTU value for heat removal that would be available if $N_2$ was present based on use of air as the oxygen-containing stream. These types of strategy examples can allow essentially the same or a similar temperature profile to be maintained in the gasifier relative to conventional operation. It is noted that if $CO_2$ is used as a diluent, this can increase the $CO_2$ concentration (and reduce the $N_2$ concentration) of the resulting flue or exhaust gas from the gasifier. This can facilitate performing carbon capture on the resulting flue or exhaust gas, or alternatively can facilitate performing carbon capture on another stream derived from the flue or exhaust gas.

In the gasification zone the reaction between the coke and/or char and the steam and the oxygen-containing gas produces carbon monoxide-containing fuel gas and a partially gasified residual coke product. In some aspects, the fuel gas can further contain $H_2$, while in other aspects the fuel gas can include a reduced or minimized content of $H_2$, such as down to containing substantially no $H_2$. Conditions in the gasifier are selected accordingly to generate these products. Steam, oxygen, and $CO_2$ (or other diluent gas) rates will depend upon the rate at which cold coke and/or char enters from the reactor. The amount of steam and oxygen can be selected so that the conditions in the gasifier correspond to partial oxidation conditions, in order to increase production of CO at the expense of $CO_2$. Generally, the conditions for partial oxidation can correspond to conditions where the amount of oxygen in the environment is substantially below the stoichiometric amount that would be needed for complete combustion of the coke and/or char particles. The amount of steam can optionally also be substantially increased. By providing a substoichiometric amount of oxygen, insufficient oxidant is available to combust the available fuel. In some aspects, the flow rate of $O_2$ introduced into the gasifier can correspond to 45% to 75% of the $O_2$ that would be required for complete combustion of all coke and char. Introducing extra steam can facilitate a water gas shift reaction, so that a portion of the CO produced by combustion is converted to $H_2$. This can assist with producing a target ratio of $H_2$ to CO in the resulting synthesis gas in the gasifier output stream.

The overhead gas product from the gasifier may contain entrained coke and/or char solids and these are removed by cyclones or other separation techniques in the gasifier section of the unit; cyclones may be internal cyclones in the main gasifier vessel itself or external in a separate, smaller vessel as described below. The overhead gas product is taken out as overhead from the gasifier cyclones. The resulting partly gasified solids are removed from the gasifier and introduced directly into the coking zone of the coking reactor at a level in the dilute phase above the lower dense phase.

In some aspects, the partly gasified solid coke and/or char particles exiting from the gasifier may not be sufficient to transport the necessary amount of heat to the pyrolysis reaction. Additionally or alternately, the total content of coke and/or char particles in the integrated reaction system may not be sufficient to maintain the desired fluidized bed condition in the pyrolysis reaction while also having particles present in the gasifier. In such aspects, additional particles can be added to the reaction system. Sand or other inert particles are one type of option. Another type of option can be to add particles that can catalyze the pyrolysis reaction. For example, spent FCC catalyst can be used as heat transfer particles. Conventionally, spent FCC catalyst is not favored for use in catalytic fast pyrolysis, as spent FCC catalyst typically results in increased char production. However, in various aspects, additional char production can be beneficial, so using spent FCC catalyst can be unexpectedly beneficial when used as heat transfer particles in an integrated pyrolysis and gasification system.

In aspects where gasification of the coke and/or char does not provide sufficient heat for the pyrolysis, additional fuel can be added the gasifier. In some aspects, a fuel such as methane or a mineral feed can be used. Preferably, the additional fuel can correspond to biomass or a fuel derived from biomass, so that any $CO_2$ generated in the gasifier corresponds to $CO_2$ generated from a fuel derived from a biological source.

An example of a fluidized coking system with an integrated gasifier is a Flexicoking™ system available from Exxon Mobil Corporation. Another example could be an FCC unit where the regenerator is run in partial combustion mode. In some aspects, the integrated process can allow for reduced or minimized production of inorganic nitrogen compounds by using oxygen from an air separation unit as the oxygen source for gasification. Although the amount of nitrogen introduced as a diluent into the gasification will be reduced, minimized, or eliminated, the integrated process can also allow for gasification of coke while reducing, minimizing, or eliminating production of slag or other glass-like substances in the gasifier. This can be achieved, for example, by recycling a portion of the $CO_2$ generated during gasification back to the gasifier. Additionally or alternately, other diluent compounds such as steam, CO, and/or inorganic compounds (such as inorganic compounds that are non-reactive in the gasifier environment) can be used as well.

One of the difficulties with using petroleum coke, coal, and/or heavy oils as a feed for gasification is that such feeds can potentially contain a relatively high percentage of transition metals, such as iron, nickel, and vanadium. During conventional operation of a gasifier, these transition metals are converted into a "slag" that tends to be corrosive for the internal structures of the gasifier. As a result, gasifiers can typically have relatively short operating lengths between shutdown events, such as operating lengths of roughly 3 months to 18 months. Biomass can include lower amounts of such metals, but the metals can still be present. Additionally, in some aspects, biomass can be co-processed with a conventional fluidized coking feed.

For an independently operated gasifier, frequent shutdown events may be acceptable. However, for a gasifier that is integrated to provide heat balance to another process, such as a fluidized bed coker, a short cycle length for the gasifier can force a short cycle length for the coker as well. In order to overcome this problem, a gasifier that is thermally integrated with a fluidized bed coking process and/or a pyrolysis process can be operated under conditions that reduce, minimize, or eliminate formation of slag.

One option for avoiding slag formation can be to use air as at least a major portion of the oxygen source for the gasifier that is integrated with the fluidized bed coking process. The additional nitrogen in air can provide a diluent for the gasifier environment that can reduce or minimize slag formation. Instead of forming a slag or other glassy type product containing metals, the metals in the coke can be retained in coke form and purged from the integrated system. This can allow the removal/disposition of the metals to be performed in a secondary device or location. By avoiding formation of the corrosive slag, the cycle length of the integrated coker and gasifier can be substantially improved. However, the additional nitrogen from using air as the oxygen-containing stream can dilute the overhead gas product from the gasifier, making it difficult to use the overhead gas as a fuel in a conventional burner. Alternatively, the additional nitrogen can increase the costs associated with recovering synthesis gas from the gasifier overhead product.

Instead of using air as the oxygen source, an oxygen-containing stream with an increased oxygen content can be used, such as an oxygen-containing stream generated by an air separation unit. While reducing the nitrogen content of the fuel gas can be beneficial, the nitrogen introduced into the gasifier also provided a benefit in the form of reducing or minimizing formation of slag or other glassy compounds in the gasifier. In order to maintain a reduced or minimized level of slag formation (such as no slag formation), an alternative diluent can instead be introduced into the gasifier. In various aspects, the alternative diluent can correspond to $CO_2$, $H_2S$, steam, other inorganic compounds, or a combination thereof. Optionally, at least a portion of the alternative diluent can correspond to a recycle stream. The addition of steam and $H_2S$ can also help reduce metal carburization and metal corrosion stemming from high carbon activity of the gasification product gases. This can help allow use of lower cost metallurgy. Although gasification is typically performed under conditions with a limited amount of oxygen present in the reaction environment, at least some $CO_2$ is typically formed by the gasification reaction. Additionally, the water-gas shift equilibrium for syngas can potentially favor additional formation of $CO_2$, depending on the temperature and the relative concentrations of $H_2$, $H_2O$, CO, and $CO_2$. As a result, the overhead product formed in the gasifier can include a substantial portion of $CO_2$. This $CO_2$ formed in the gasifier environment can be separated out by any convenient method, such as by use of a monoethanol amine wash or another type of amine wash. Conveniently, an amine wash can also be suitable for removal of any $H_2S$ that is formed during gasification (such as by reaction of $H_2$ with sulfur that is present in the coke). In some aspects, multiple amine regeneration steps can be used to desorb $CO_2$ and $H_2S$ rich streams separately, thus allowing for control over the amount of recycled $CO_2$ while also allowing for separate handling of $H_2S$. In some aspects, $H_2S$ can be first removed using selective amine washing, such as a Flexsorb™ process, before using a more general amine wash for $CO_2$ separation. The pressure at which amine absorption of $CO_2$ takes place can be in the range of roughly 20 Psia to 1500 Psia (~140 kPa-a to 10.5 MPa-a) and it is optimized based on the overall configuration of the plant, including factors such as utilization of low pressure or high pressure CO shift reaction section and compression costs. At higher pressures the choice of amine or solvent for absorption of $CO_2$ expands, which can minimize cost and energy requirement of $CO_2$ absorption and desorption. At lower pressures amines like methylethylamine (MEA) can be preferred. At moderate pressures amines like methyldiethylamine (MDEA) can be preferred. At high pressures chemical solvents such as methanol can be preferred.

After separation of $CO_2$ and/or $H_2S$ from the fuel gas, a portion of the $CO_2$ can be recycled back to the gasifier as a diluent to reduce or minimize formation of slag. In some aspects, the net concentration of $O_2$ in the oxygen stream introduced into the gasifier, after addition of any diluent and/or steam, can be 22 vol % to 60 vol % relative to the weight of the combined oxygen stream plus diluent and/or steam. In aspects where $CO_2$ is recycled, at least a portion of the $H_2S$ present in a $CO_2$ stream can be removed prior to recycling the $CO_2$ stream to the gasifier. This can assist with maintaining conditions in the gasifier that allow the metals and/or ash content of coke to be removed from the gasifier as part of a coke purge, as opposed to forming a corrosive slag. Alternatively, a portion of the fuel gas after or before a $H_2S$ adsorption (such as a Flexsorb unit) can be compressed and recycled back as the diluent stream.

By reducing or minimizing the content of $N_2$ in the fuel gas while also reducing or minimizing slag formation, the fuel gas generated by an integrated coker/gasifier can have a substantially increased content of synthesis gas. After removal of sulfur contaminants, water, and/or a majority of $CO_2$, the resulting overhead gas can correspond to 70 vol % to 99 vol % of $H_2$ and CO, or 80 vol % to 95 vol %, which are the components of synthesis gas for methanol production. This is a sufficient purity and/or a sufficiently high quality to potentially be valuable to use in synthesis of other compounds.

Examples of Integrated Reaction Systems

In various aspects, pyrolysis and gasification can be performed in an integrated manner in a fluidized coking apparatus. In the integrated process, a feed including at least a portion of biomass is initially exposed to thermal cracking conditions (i.e., pyrolysis) in a fluidized bed of heated solid particles to produce hydrocarbons of lower molecular weight and boiling point. The pyrolysis process also generates char (from biomass) and/or coke (from mineral feeds) as a by-product which is deposited on the solid particles in the fluidized bed. The resulting char and/or coke can then be converted to a product including synthesis gas by contact at elevated temperature with steam and an oxygen-containing gas in a gasification reactor (gasifier) under partial oxidation conditions. Optionally, a "heater" vessel can be included as part of the integrated system, to provide a separate vessel for heat exchange between heated particles from the gasifier and cooled particles for return to the reactor vessel to provide the heat for pyrolysis.

FIG. 1 shows an example of a system including a gasifier that is thermally integrated with a fluidized bed coker with three reaction vessels: reactor, heater and gasifier. The unit comprises reactor section 10 with the pyrolysis zone and its associated stripping and scrubbing sections (not separately indicated), heater section 11 and gasifier section 12. The relationship of the pyrolysis zone, scrubbing zone and stripping zone in the reactor section is shown, for example, in U.S. Pat. No. 5,472,596, which describes those relationships in an aspect where the pyrolysis zone corresponds to a coking zone for a conventional feedstock. U.S. Pat. No. 5,472,594 is incorporated herein by reference for the limited purpose of further describing the relationships between the pyrolysis zone, the scrubbing zone, and stripping zone. A heavy oil feed is introduced into the unit by line 13 and pyrolyzed and/or cracked hydrocarbon product withdrawn through line 14. Fluidizing and stripping steam is supplied by line 15. Cold char, coke, and/or other particles (such as sand) for forming the fluidized bed are taken out from the stripping section at the base of reactor 10 by means of line 16 and passed to heater 11. The term "cold" as applied to the temperature of the withdrawn char/coke/particles is, of course, decidedly relative since it is well above ambient at the operating temperature of the stripping section. Hot char/coke/particles are circulated from heater 11 to reactor 10 through line 17. Char/coke/particles from heater 11 are transferred to gasifier 12 through line 21 and hot, partly gasified particles of char/coke/sand are circulated from the gasifier back to the heater through line 22. A portion of excess char/coke/particles can be withdrawn from the heater 11 by way of line 23. This can be beneficial, for example, for reducing or minimizing the accumulation of metals in the gasifier.

Gasifier 12 can be provided with its supply of steam and an oxygen-containing gas by line 24. The heated gasification product, including synthesis gas, can be taken from the gasifier to the heater though line 25. In some aspects, the oxygen-containing gas can correspond to air. In other aspects, instead of supplying air via a line 24 to the gasifier 12, a stream of oxygen with 55 vol % purity or more can be provided, such as an oxygen stream from an air separation unit. In such aspects, in addition to supplying a stream of oxygen, a stream of an additional diluent gas can be supplied by line 31. The additional diluent gas can correspond to, for example, $CO_2$ separated from the fuel gas generated during the gasification. The gasification product, including the synthesis gas, can be taken out from the unit through line 26 on the heater. Particle fines, such char fines or coke fines, can be removed from the gasification product in heater cyclone system 27 comprising serially connected primary and secondary cyclones with diplegs which return the separated fines to the fluid bed in the heater. The gasification product from line 26 can then undergo further processing, such as separation of desired synthesis gas components from a remaining portion of the gasification product.

It is noted that in some optional aspects, heater cyclone system 27 can be located in a separate vessel (not shown) rather than in heater 11. In such aspects, line 26 can withdraw the gasification product from the separate vessel, and the line 23 for purging excess coke can correspond to a line transporting coke fines away from the separate vessel. These coke fines and/or other partially gasified coke particles that are vented from the heater (or the gasifier) can have an increased content of metals relative to the feedstock. For example, the weight percentage of metals in the coke particles vented from the system (relative to the weight of the vented particles) can be greater than the weight percent of metals in the feedstock (relative to the weight of the feedstock). In other words, the metals from the feedstock are concentrated in the vented coke particles. Since the gasifier conditions do not create slag, the vented coke particles correspond to the mechanism for removal of metals from the coker/gasifier environment. In some aspects, the metals can correspond to a combination of nickel, vanadium, and/or iron. Additionally or alternately, the gasifier conditions can cause substantially no deposition of metal oxides on the interior walls of the gasifier, such as deposition of less than 0.1 wt % of the metals present in the feedstock introduced into the coker/gasifier system, or less than 0.01 wt %.

In configurations such as FIG. 1, the system elements shown in the figure can be characterized based on fluid communication between the elements. For example, reactor section 10 is in direct fluid communication with heater 11.

Reactor section 10 is also in indirect fluid communication with gasifier 12 via heater 11.

As an alternative, integration of a fluidized bed coker with a gasifier can also be accomplished without the use of an intermediate heater. In such alternative aspects, the cold coke from the reactor can be transferred directly to the gasifier. This transfer, in almost all cases, will be unequivocally direct with one end of the tubular transfer line connected to the coke outlet of the reactor and its other end connected to the coke inlet of the gasifier with no intervening reaction vessel, i.e. heater. The presence of devices other than the heater is not however to be excluded, e.g. inlets for lift gas etc. Similarly, while the hot, partly gasified coke particles from the gasifier are returned directly from the gasifier to the reactor this signifies only that there is to be no intervening heater, but that other devices may be present between the gasifier and the reactor, e.g. gas lift inlets and outlets.

Figure 2:
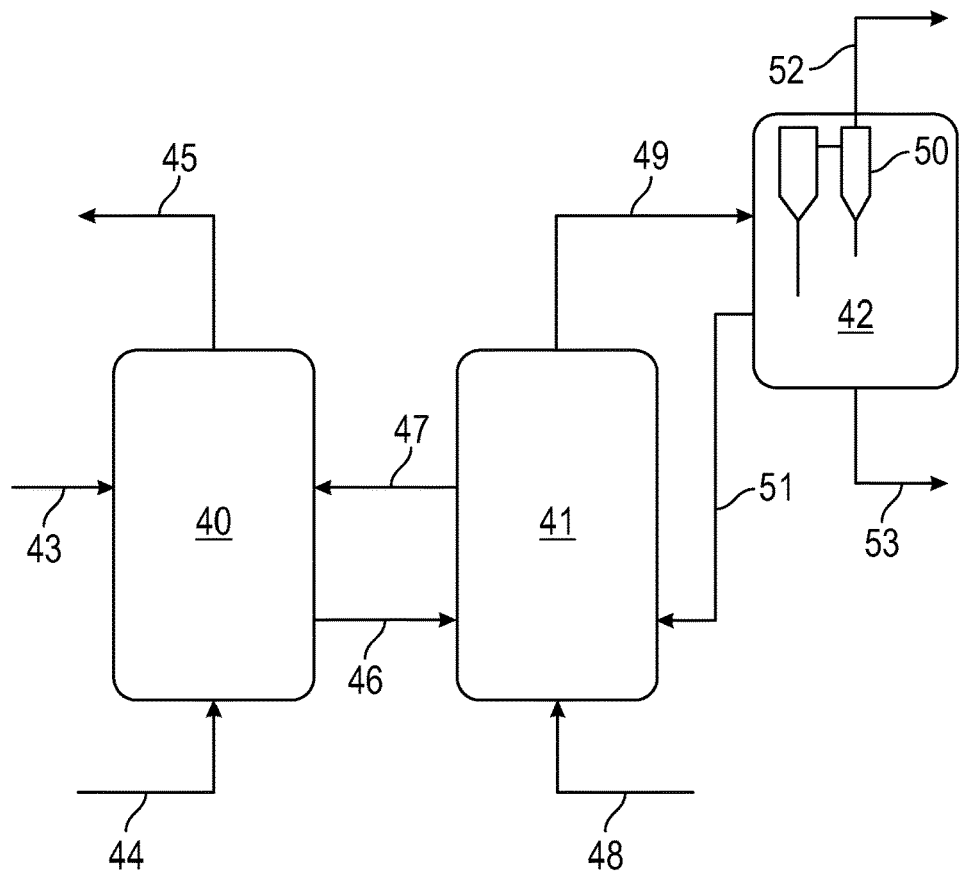
FIG. 2 shows an example of a fluidized bed coking system including a coker and a gasifier.

FIG. 2 shows an example of integration of a fluidized bed coker with a gasifier but without a separate heater vessel. In the configuration shown in FIG. 2, the cyclones for separating fuel gas from catalyst fines are located in a separate vessel. In other aspects, the cyclones can be included in gasifier vessel 41.

In the configuration shown in FIG. 2, the configuration includes a reactor 40, a main gasifier vessel 41 and a separator 42. The heavy oil feed is introduced into reactor 40 through line 43 and fluidizing/stripping gas through line 44; cracked hydrocarbon products are taken out through line 45. Cold, stripped char/coke/particles are routed directly from reactor 40 to gasifier 41 by way of line 46 and hot char/coke/particles are returned to the reactor in line 47. Steam and an oxygen-containing gas are supplied through line 48. The flow of gasification product containing fines is routed to separator vessel 42 through line 49 which is connected to a gas outlet of the main gasifier vessel 41. The fines are separated from the gas flow in cyclone system 50 comprising serially connected primary and secondary cyclones with diplegs which return the separated fines to the separator vessel. The separated fines are then returned to the main gasifier vessel through return line 51 and the gasification product taken out by way of line 52. Char/coke/particles are purged from the separator through line 53. The gasification product from line 26 can then undergo further processing, such as separation of desired synthesis gas components from a remaining portion of the gasification product.

Example 1—Coke Production, Partial Gasification, and Heat Balance

Coking is a type of pyrolysis. The conditions for fast pyrolysis can be similar to the conditions for fluidized coking. This can facilitate performing co-processing of biomass with a conventional fluidized coking feedstock in a fluidized coking reaction system.

Table 1 shows a comparison of typical compositions for coke produced during fluidized coking of a heavy oil mineral feed and char produced during fast pyrolysis of biomass.

TABLE 1

Comparison of Char and Coke

| Coke/Char Comp | Char from pyrolysis of Pine at 550° C. | | Gross Coke from Fluidized Coking of Mineral Feed at 530° C. |
|---|---|---|---|
| C | 86.9% | wt % | 86.8% |
| H | 3.4% | | 4% |
| O | 7.8% | | 0.8% |
| N | 0.4% | | 1.5% |
| S | 0% | | 6.7% |
| HHV | 33.75 | MJ/kg | 36.4 |

As shown in Table 1, char from biomass is primarily composed of carbon, hydrogen, and oxygen. This is in contrast to the composition of coke from a heavy oil mineral feed, which is primarily composed of carbon, hydrogen, and sulfur. The compositions are otherwise similar, but the higher heating value of the coke is greater than the higher heating value of the char by roughly 10%. This means that under either complete or partial oxidation conditions, additional weight of char is needed to achieve the same heat during gasification as compared to coke.

Table 2 shows a comparison of operating conditions and products for operating a fluidized coking reaction system either for fluidized coking of a conventional heavy oil feedstock, or fast pyrolysis of biomass. The reaction system configuration for the values in Table 2 is similar to the configuration shown in FIG. 1. The fluidized coking values represent experimental data, while the pyrolysis values are a prediction based on public sources regarding yields from pyrolysis of biomass.

TABLE 2

Comparison of Fluidized Coking Operation and Pyrolysis of Biomass in Fluidized Coking Reactor

| | Fluidized Coking (mineral feed) | Pyrolysis (100% Biomass-Calculated) |
|---|---|---|
| T (dilute Phase) | 530 C. | 530 C. |
| P (Dilute Phase) | 35 psia | 35 psia |
| Feed Rate | 46 kbd | 5000 T/day |
| C5+ product rate (klb/hr) | 360 | 330 |
| Gas Phase Product (klb/hr) | 95 | 50 |
| Coke/Char Make (klb/hr) | 165 | 60 |

In Table 2, the pyrolysis conditions were selected to be similar to fluidized coking conditions. The feed rate was selected so that the biomass heat of pyrolysis is equivalent to the heat of pyrolysis (coking) that was needed for the fluidized coking example. As shown in Table 2, the product yields for pyrolysis of biomass are generally lower, due in part to the fact that biomass pyrolysis also typically results in production of water, on the order of roughly 10 wt % of the total product. The weight ratio of char relative to the weight of gas phase products is also reduced for the biomass pyrolysis example.

It is noted that under partial gasification conditions, the weight of char produced by pyrolysis in Table 2 is not sufficient to provide the required heat for maintaining the pyrolysis reaction. One option for generating additional heat in the gasifier can be to add biomass directly to the gasifier. This can increase both the heat output and the output of synthesis gas generated in the gasifier. Additionally, by using biomass as the supplemental fuel in the gasifier, any $CO_2$ generated from gasification of the biomass will correspond to $CO_2$ derived from a biogenic source, thereby reducing or minimizing the net greenhouse gas emissions associated with the process.

The addition of biomass to the gasifier does not result in a substantial change in the composition of the overhead gas from a gasifier. To illustrate this, modeling calculations were performed for gasification of char from biomass in a gasifier. A second set of calculations were also performed where 20 wt % of the feed into the gasifier corresponded to biomass rather than char. In the calculations, air was used as the source of oxygen-containing gas. Table 3 shows the overhead gas compositions from the calculations.

TABLE 3

Gasifier Overhead Product Gas Compositions

|  | 100% coke/char Feed (mol %) | 80% Coke/Char + 20% Biomass (mol %) |
| --- | --- | --- |
| $H_2$ | 13.4 | 13.1 |
| $N_2$ | 49.9 | 50.0 |
| CO | 17.7 | 15.0 |
| $CO_2$ | 9.0 | 9.8 |
| $H_2O$ | 9.4 | 11.6 |
| $H_2S$ | 0.52 | 0.45 |
| COS | 0.03 | 0.02 |

As shown in Table 3, incorporating 20 wt % biomass into the input flows into the gasification reaction had only a modest impact on the overall product distribution. It appears that the biomass resulted in extra water being present in the gasifier environment, with a small reduction in the total content of carbon oxides.

ADDITIONAL EMBODIMENTS

Embodiment 1. A method for converting biomass, comprising: exposing a feed comprising biomass to a fluidized bed comprising solid particles in a reactor under pyrolysis conditions to form i) a liquid pyrolysis product comprising pyrolysis oil, ii) char, coke, or a combination thereof, and iii) a gas phase pyrolysis product, at least a portion of the char, coke, or combination thereof being deposited on the solid particles; passing at least a portion of solid particles comprising deposited char, coke, or a combination thereof from the reactor into a gasifier; introducing an oxygen-containing stream and steam into the gasifier; exposing the at least a portion of the solid particles comprising deposited char, coke, or a combination thereof to partial oxidation conditions in the gasifier to form a partially gasified particles and a gas phase gasifier product comprising CO, $CO_2$, and optionally $H_2$; and passing at least a portion of the partially gasified particles from the gasifier to the reactor.

Embodiment 2. The method of Embodiment 1, wherein the feed comprises 50 wt % or more biomass; or wherein a ratio of a weight of the char, coke, or a combination thereof to a weight of the gas phase gasifier product is 1.6 or more; or a combination thereof.

Embodiment 3. The method of any of the above embodiments, wherein the feed further comprises a mineral feedstock.

Embodiment 4. The method of any of the above embodiments, wherein the oxygen-containing stream comprises 45% to 75% of a stoichiometric amount of oxygen to combust the char, coke, or a combination thereof.

Embodiment 5. The method of any of the above embodiments, wherein the solid particles comprise particles of sand, particles of spent fluid catalytic cracking catalyst, or a combination thereof.

Embodiment 6. The method of any of the above embodiments, further comprising separating $CO_2$ from the gas phase gasifier product to form a synthesis gas stream and a $CO_2$-containing product, wherein optionally a portion of the $CO_2$-containing product is recycled to the gasifier as a diluent.

Embodiment 7. The method of any of the above embodiments, wherein the oxygen-containing stream comprises 21 vol % or more of $O_2$, or wherein the oxygen-containing stream comprises 50 vol % or less of $N_2$, or a combination thereof.

Embodiment 8. The method of any of the above embodiments, wherein at least a portion of the gas phase pyrolysis product is passed into the reactor as a fluidizing gas for the fluidized bed.

Embodiment 9. The method of any of the above embodiments, wherein the reactor comprises a fluidized coking reactor.

Embodiment 10. The method of Embodiment 9, wherein passing at least a portion of the solid particles comprising deposited char, coke, or a combination thereof from the reactor to the gasifier comprises passing the at least a portion of the solid particles comprising deposited char, coke, or a combination thereof to a heater, and passing the at least a portion of the solid particles comprising deposited char, coke, or a combination thereof from the heater to the gasifier.

Embodiment 10. The method of Embodiment 9 or 10, wherein passing at least a portion of the partially gasified coke particles from the gasifier to the reactor comprises passing the at least a portion of partially gasified coke particles to a heater, and passing the at least a portion of the partially gasified coke particles from the heater to the reactor.

Embodiment 11. The method of any of Embodiments 1 to 8, wherein the reactor comprises a riser reactor, the partial oxidation conditions optionally comprising a temperature of 650° C. to 760° C.

Embodiment 12. The method of Embodiment 11, wherein the fluidized bed comprises a moving bed, the solid particles in the moving bed comprising a superficial velocity of 10 to 25 m/s.

Embodiment 13. The method of any of the above embodiments, wherein the partial oxidation conditions comprise a temperature of 650° C. to 1000° C.

Embodiment 14. The method of any of the above embodiments, wherein the feed comprising biomass is exposed to the pyrolysis conditions in the presence of 0.1 vol % or less of added oxygen, or wherein the pyrolysis conditions comprise a temperature of 450° C. to 750° C., or a combination thereof.

Embodiment 15. A liquid phase pyrolysis product and a gas phase gasifier product formed according to the method of any of Embodiments 1 to 14.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for converting biomass, comprising:
exposing a feed comprising biomass to a fluidized bed comprising solid particles in a reactor under pyrolysis conditions to form i) a liquid pyrolysis product comprising pyrolysis oil, ii) char, coke, or a combination thereof, and iii) a gas phase pyrolysis product, at least a portion of the char, coke, or combination thereof being deposited on the solid particles;
passing at least a portion of solid particles comprising deposited char, coke, or a combination thereof from the reactor into a gasifier;
introducing an oxygen-containing stream and steam into the gasifier;
exposing the at least a portion of the solid particles comprising deposited char, coke, or a combination thereof to partial oxidation conditions in the gasifier to form a gas phase gasifier product comprising CO and $CO_2$, and partially gasified particles; and
passing at least a portion of the partially gasified particles from the gasifier to the reactor.

2. The method of claim 1, wherein the feed comprises 50 wt % or more biomass.

3. The method of claim 2, wherein a ratio of a weight of the char, coke, or a combination thereof to a weight of the gas phase gasifier product is 1.6 or more.

4. The method of claim 1, wherein the gas phase gasifier product further comprises $H_2$.

5. The method of claim 1, wherein the feed further comprises a mineral feedstock.

6. The method of claim 1, wherein the oxygen-containing stream comprises 45% to 75% of a stoichiometric amount of oxygen to combust the char, coke, or a combination thereof.

7. The method of claim 1, wherein the solid particles comprise particles of sand, or wherein the solid particles comprise particles of spent fluid catalytic cracking catalyst, or a combination thereof.

8. The method of claim 1, further comprising separating $CO_2$ from the gas phase gasifier product to form a synthesis gas stream and a $CO_2$-containing product.

9. The method of claim 8, wherein a portion of the $CO_2$-containing product is recycled to the gasifier as a diluent.

10. The method of claim 1, wherein the oxygen-containing stream comprises 21 vol % or more of $O_2$, or wherein the oxygen-containing stream comprises 50 vol % or less of $N_2$, or a combination thereof.

11. The method of claim 1, wherein at least a portion of the gas phase pyrolysis product is passed into the reactor as a fluidizing gas for the fluidized bed.

12. The method of claim 1, wherein the reactor comprises a fluidized coking reactor.

13. The method of claim 12, wherein passing at least a portion of the solid particles comprising deposited char, coke, or a combination thereof from the reactor to the gasifier comprises passing the at least a portion of the solid particles comprising deposited char, coke, or a combination thereof to a heater, and passing the at least a portion of the solid particles comprising deposited char, coke, or a combination thereof from the heater to the gasifier.

14. The method of claim 12, wherein passing at least a portion of the partially gasified coke particles from the gasifier to the reactor comprises passing the at least a portion of partially gasified coke particles to a heater, and passing the at least a portion of the partially gasified coke particles from the heater to the reactor.

15. The method of claim 1, wherein the partial oxidation conditions comprise a temperature of 650° C. to 1000° C.

16. The method of claim 1, wherein the reactor comprises a riser reactor.

17. The method of claim 16, wherein the fluidized bed comprises a moving bed, the solid particles in the moving bed comprising a superficial velocity of 10 to 25 m/s.

18. The method of claim 16, wherein the partial oxidation conditions comprise a temperature of 650° C. to 760° C.

19. The method of claim 1, wherein the feed comprising biomass is exposed to the pyrolysis conditions in the presence of 0.1 vol % or less of added oxygen.

20. The method of claim 1, wherein the pyrolysis conditions comprise a temperature of 450° C. to 750° C.

* * * * *